(12) United States Patent
Sonoda et al.

(10) Patent No.: US 10,161,317 B2
(45) Date of Patent: Dec. 25, 2018

(54) GAS-TURBINE CONTROL DEVICE, GAS TURBINE, AND GAS-TURBINE CONTROL METHOD

(71) Applicant: MITSUBISHI HITACHI POWER SYSTEMS, LTD., Yokohama (JP)

(72) Inventors: Takashi Sonoda, Tokyo (JP); Kazuya Higashi, Tokyo (JP); Akihiko Saito, Tokyo (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 68 days.

(21) Appl. No.: 15/105,344

(22) PCT Filed: Feb. 4, 2015

(86) PCT No.: PCT/JP2015/053057
§ 371 (c)(1),
(2) Date: Jun. 16, 2016

(87) PCT Pub. No.: WO2015/119135
PCT Pub. Date: Aug. 13, 2015

(65) Prior Publication Data
US 2017/0002748 A1 Jan. 5, 2017

(30) Foreign Application Priority Data

Feb. 5, 2014 (JP) ................. 2014-020529

(51) Int. Cl.
*F02C 9/54* (2006.01)
*F02C 9/20* (2006.01)
(Continued)

(52) U.S. Cl.
CPC .................. *F02C 9/54* (2013.01); *F02C 9/20* (2013.01); *F02C 9/22* (2013.01); *H02K 7/1823* (2013.01);
(Continued)

(58) Field of Classification Search
CPC ..... F02C 9/54; F02C 9/20; F02C 9/22; H02K 7/1823
See application file for complete search history.

(56) References Cited

U.S. PATENT DOCUMENTS 8,694,170 B2 * 4/2014 Sonoda .................. F01D 17/16
60/39.27
9,732,676 B2 * 8/2017 Saito ........................ F02C 7/22
(Continued)

FOREIGN PATENT DOCUMENTS

| CN | 1904327 | 1/2007 |
| CN | 101779021 | 7/2010 |

(Continued)

OTHER PUBLICATIONS

International Search Report dated Apr. 28, 2015 in International (PCT) Application No. PCT/JP2015/053057.
(Continued)

*Primary Examiner* — Viet Nguyen
(74) *Attorney, Agent, or Firm* — Wenderoth, Lind & Ponack, L.L.P.

(57) ABSTRACT

A gas turbine drives a power generator by rotating a turbine using combustion gas generated in a combustor as a result of supplying the combustor with fuel and compressed air from a compressor, which is provided with an inlet guide vane at a front stage. An operation control device of the gas turbine enables an IGV priority open flag when the inlet guide vane is not fully open and when the system frequency is lower than or equal to a predetermined threshold value α or there is a request for increasing the output of the gas turbine. When the IGV priority open flag is enabled, the operation control device sets the degree of opening of the inlet guide vane to be larger than before. Accordingly, the output can be increased without having to increase the turbine inlet tem-
(Continued)

perature, regardless of the operational state of the gas turbine.

10 Claims, 14 Drawing Sheets

(51) Int. Cl.
*H02K 7/18* (2006.01)
*F02C 9/22* (2006.01)

(52) U.S. Cl.
CPC .... *F05D 2220/32* (2013.01); *F05D 2270/053* (2013.01); *F05D 2270/061* (2013.01); *F05D 2270/3061* (2013.01)

(56) References Cited

U.S. PATENT DOCUMENTS

| | | | | |
|---|---|---|---|---|
| 2008/0295480 | A1* | 12/2008 | Hyakutake | C10J 3/00 60/39.12 |
| 2010/0058730 | A1* | 3/2010 | Sonoda | F01D 21/14 60/39.12 |
| 2010/0198419 | A1* | 8/2010 | Sonoda | F01D 17/16 700/290 |
| 2017/0292458 | A1* | 10/2017 | Nakagawa | F02C 7/228 |

FOREIGN PATENT DOCUMENTS

| | | |
|---|---|---|
| JP | 2003-206749 | 7/2003 |
| JP | 2003-239763 | 8/2003 |
| JP | 2004-027848 | 1/2004 |
| JP | 3887777 | 12/2006 |
| JP | 2008-075578 | 4/2008 |
| JP | 2009-114956 | 5/2009 |
| JP | 2011-111996 | 6/2011 |
| JP | 2014-047728 | 3/2014 |
| WO | 2009/060889 | 5/2009 |

OTHER PUBLICATIONS

Written Opinion of the International Searching Authority dated Apr. 28, 2015 in International (PCT) Application No. PCT/JP2015/053057.

Notification of Reasons for Refusal dated Jun. 6, 2017 in corresponding Japanese Patent Application No. 2014-020529 with English translation.

First Office Action dated Jan. 18, 2017 in corresponding Chinese Application No. 201580003346.X, with English translation.

* cited by examiner

GAS-TURBINE CONTROL DEVICE, GAS TURBINE, AND GAS-TURBINE CONTROL METHOD

TECHNICAL FIELD

The present invention relates to gas-turbine control devices, gas turbines, and gas-turbine control methods.

BACKGROUND ART

A typical gas turbine used in, for example, a power plant sprays fuel into air compressed by a compressor so as to combust the air, and introduces the resultant high-temperature high-pressure combustion gas to a turbine so as to extract the output power. FIG. 11 illustrates the basic configuration of such a gas turbine. A gas turbine 100 includes a compressor 102, a combustor 103, and a turbine 101. The combustor 103 is supplied with air compressed by the compressor 102 and fuel gas flow-controlled by a fuel flow control valve 105, the degree of opening of which is controlled in accordance with the load. High-temperature combustion gas combusted in the combustor 103 is supplied to the turbine 101 and is expanded so as to drive the turbine 101. This driving force is transmitted to a power generator 150 where electricity is generated, and is also transmitted to the compressor 102 so as to drive the compressor.

In the case of a single-shaft combined-cycle power plant, rotation shafts of the gas turbine 100, the power generator 150, and a steam turbine 160 are combined into a single unit.

An inlet guide vane (IGV) 104 is provided in front of the first-stage airfoil of the compressor 102. By controlling the degree of opening of a guide vane at the inlet of the compressor, the inlet guide vane 104 changes the amount of air flowing between rotor blades of the compressor 102 and into the combustor 103 so as to control the exhaust gas temperature in the gas turbine 100 to a target value. Intake air is given a certain circumferential speed by the inlet guide vane 104 and is introduced to the compressor 102. In the compressor 102, the air introduced thereto travels through multiple stages of rotor blades and stator vanes and increases in pressure by being given energy.

In the inlet guide vane 104, a large number of movable vanes provided in the circumferential direction are supported in a rotatable manner, and an actuator is actuated in accordance with a drive signal from an operation control device 110 so that these movable vanes are moved, whereby the intake-air flow and the combustion temperature are adjusted.

More specifically, the operation control device 110 has the configuration shown in FIG. 12 for generating an IGV degree-of-opening command for the actuator of the inlet guide vane 104. The operation control device 110 has a multiplier 11, a table function unit (FX1) 12, a limiter 13, a correction function unit (FX2) 14, and a limiter function unit (FX3) 15. Basically, the degree of opening of the IGV is set on the basis of the function shown in FIG. 13(a) in accordance with a power-generator output (GT output). The correction function unit (FX2) 14 generates a GT-output correction coefficient K2 on the basis of a relationship corresponding to the compressor inlet temperature shown in FIG. 13(b), and the multiplier 11 multiplies this correction coefficient K2 by the GT output, so that a GT output value is corrected with reference to a table function. Furthermore, the limiter function unit (FX3) 15 generates an IGV maximum degree of opening M1 on the basis of a relationship corresponding to the compressor inlet temperature shown in FIG. 13(c), and the limiter 13 performs limitation so that the degree of opening of the IGV generated at the table function unit (FX1) 12 does not exceed the IGV maximum degree of opening M1.

Because the rotation shaft of the turbine 101 and the power generator 150 are linked with each other in the configuration shown in FIG. 11, the load in the power generating unit changes in accordance with a change in the system frequency. For example, in a case where the system frequency decreases, the rotation speed also decreases. In order to maintain a specific rotation speed, it is necessary to increase the amount of fuel to be supplied in the gas-turbine power generating unit. For example, Patent Literatures 1 and 2 each disclose a prior-art feature in which operation control is performed in correspondence with such a frequency change. Patent Literature 1 discloses a feature for switching to a control mode that is different from a normal control mode and that mainly focuses on recovery of the system frequency when an abnormality is detected in the system frequency. Patent Literature 2 discloses a governor-free control method in which the rate of change of the system frequency is controlled to be within a limitation range.

CITATION LIST

Patent Literature

{PTL 1}
Japanese Unexamined Patent Application, Publication No. 2004-27848
{PTL 2}
Japanese Unexamined Patent Application, Publication No. 2003-239763

SUMMARY OF INVENTION

Technical Problem

In recent years, there has been an increasing demand both domestically and abroad for improving the performance in partial-load operation.

In the related art, when the load increases in accordance with the setting rate in a case where the frequency decreases in a partial load or when there is a load increase command, the gas turbine 100 increases the amount of fuel. However, since temperature control operation is performed from the standpoint of protecting devices from damage caused by an increase in the combustion temperature (i.e., the turbine inlet temperature), there is a concern that a desired load cannot be obtained.

Specifically, when a decrease in the system frequency, as shown in FIG. 14(a), is dealt with by fuel control alone without changing the degree of opening of the inlet guide vane 104 of the gas turbine 100 (see FIG. 14(b)), there is a possibility that the turbine inlet temperature may exceed an overshoot limit value and also exceed the limitations of device protection, as shown in FIG. 14(e), in order to satisfy a grid-code request response with respect to shaft output, as shown in FIG. 14(c).

On the other hand, if overshooting of the turbine inlet temperature is not allowed from the standpoint of device protection, there is a possibility that the grid-code request response with respect to the shaft output, as shown in FIG. 14(c), cannot be satisfied. In particular, in the case of a single-shaft combined-cycle power plant in which the gas turbine 100 and the steam turbine 160 share the same shaft, an increase in the output of the steam turbine 160 (ST output) is delayed, as shown in FIG. 14(d). Therefore, in order to satisfy the shaft output defined based on the grid code, the lack of output from the steam turbine 160 has to be compensated for by overload operation of the gas turbine 100.

The present invention has been made in view of these circumstances, and an object thereof is to provide a gas-turbine control device, a gas turbine, and a gas-turbine control method that can increase the output without having to increase the turbine inlet temperature, regardless of the operational state of the gas turbine.

Solution to Problem

In order to solve the aforementioned problem, a gas-turbine control device, a gas turbine, and a gas-turbine control method according to the present invention employ the following solutions.

A gas-turbine control device according to a first aspect of the present invention drives a power generator by rotating a turbine using combustion gas generated in a combustor as a result of supplying the combustor with fuel and compressed air from a compressor, which is provided with an inlet guide vane at a front stage. The gas-turbine control device includes an IGV-control-flag generating unit and an inlet-guide-vane degree-of-opening setting unit. The IGV-control-flag generating unit enables an IGV priority open flag if a system frequency is lower than or equal to a predetermined threshold value or if an increase of an output of the gas turbine is requested when the output of the gas turbine is to be increased. The inlet-guide-vane degree-of-opening setting unit sets a degree of opening of the inlet guide vane to be larger than before if the IGV priority open flag is enabled.

According to this configuration, in the case where the output of the gas turbine is to be increased, the IGV-control-flag generating unit enables the IGV priority open flag.

When the IGV priority open flag is enabled, the inlet-guide-vane degree-of-opening setting unit sets the degree of opening of the inlet guide vane to be larger than before.

Because the turbine inlet temperature is proportional to the fuel-air ratio (i.e., the ratio of the amount of fuel to the amount of combustible air), changing the degree of opening in the direction that causes the inlet guide vane to open would increase the intake-air flow of the compressor and thus increase the amount of combustible air, thereby causing the fuel-air ratio, that is, the turbine inlet temperature, to decrease.

Furthermore, the relationship "turbine output=turbine-passing flow×turbine heat drop×efficiency" holds, so that by changing the degree of opening in the direction that causes the inlet guide vane to open, the intake-air flow of the compressor increases, thereby also causing the turbine-passing flow to increase. Therefore, if an increase in the turbine-passing flow has a greater contribution than a heat drop caused by a decrease in the turbine inlet temperature, the output of the power generator would increase.

Consequently, the output can be increased without having to increase the turbine inlet temperature, regardless of the operational state of the gas turbine.

In the first aspect described above, the IGV-control-flag generating unit may enable the IGV priority open flag when a system frequency is lower than or equal to a predetermined threshold value or when an increase of the output of the gas turbine is requested.

According to this configuration, the output can be increased without having to increase the turbine inlet temperature, regardless of the operational state of the gas turbine.

In the first aspect described above, the inlet-guide-vane degree-of-opening setting unit may set a rate of change of the degree of opening of the inlet guide vane such that a rate of increase of the output of the turbine is higher than a rate of increase of power of the compressor.

According to this configuration, a temporary decrease in the gas-turbine output (power-generator output) occurring with an increase in the power of the compressor caused by opening the inlet guide vane can be suppressed.

In the first aspect described above, the gas-turbine control device may further include a temperature control unit that sets a temperature control setting in accordance with a casing pressure. The temperature control unit may have a first correcting unit that calculates a rate of change of the degree of opening of the inlet guide vane, calculates a correction amount according to the rate of change, and corrects the temperature control setting when the IGV priority open flag is enabled.

This configuration can speed up the followability of an exhaust-gas-temperature set value or a blade-passing-temperature set value so as to transiently speed up the relaxation of the temperature setting, thereby improving the load responsiveness relative to a change in the system frequency.

In the first aspect described above, the gas-turbine control device may further include a temperature control unit that sets a temperature control setting in accordance with a casing pressure. The temperature control unit may have a PI control unit that performs proportional-plus-integral control on the basis of a deviation between a target value based on the temperature control setting and either a measured blade-passing temperature or an exhaust gas temperature so as to generate a blade-passing-temperature set value or an exhaust-gas-temperature set value of the turbine. When the IGV priority open flag is enabled, the temperature control unit may set a control parameter in the PI control unit to a preset value.

This configuration can speed up the change of the blade-passing-temperature set value or the exhaust-gas-temperature set value, thereby improving the load responsiveness when the system frequency changes.

In the first aspect described above, the gas-turbine control device may further include a temperature control unit that sets a temperature control setting in accordance with a casing pressure. The temperature control unit may have a second correcting unit that calculates a rate of change of the degree of opening of the inlet guide vane, calculates a correction amount according to the rate of change, and corrects a blade-passing-temperature set value or an exhaust-gas-temperature set value of the turbine generated on the basis of the temperature control setting.

This configuration can directly give priority to the change of the blade-passing-temperature set value or the exhaust-gas-temperature set value. This speeds up the followability so as to transiently speed up the relaxation of the temperature setting, thereby improving the load responsiveness when the system frequency changes.

In the first aspect described above, when the IGV priority open flag changes from an enabled state to a disabled state, the IGV-control-flag generating unit may disable the IGV priority open flag after a certain delay.

According to this configuration, frequent opening-closing operation of the inlet guide vane can be prevented.

In the first aspect described above, when the IGV priority open flag is enabled, fuel flow may be increased in accordance with the degree of opening of the inlet guide vane.

According to this configuration, the fuel flow can be increased in accordance with an increase in air flow caused by increasing the degree of opening of the inlet guide vane, thereby preventing an excessive decrease in the turbine inlet temperature.

A gas turbine according to a second aspect of the present invention includes a compressor provided with an inlet guide vane at a front stage, a combustor that generates combustion gas by being supplied with fuel and compressed air from the compressor, a turbine rotated by the combustion gas generated in the combustor, a power generator driven by the rotation of the turbine, and the aforementioned control device.

A gas-turbine control method according to a third aspect of the present invention is for driving a power generator by rotating a turbine using combustion gas generated in a combustor as a result of supplying the combustor with fuel and compressed air from a compressor, which is provided with an inlet guide vane at a front stage. The gas-turbine control method includes an IGV-control-flag generating step for enabling an IGV priority open flag when an output of the gas turbine is to be increased, and an inlet-guide-vane degree-of-opening setting step for setting a degree of opening of the inlet guide vane to be larger than before if the IGV priority open flag is enabled.

Advantageous Effects of Invention

The present invention is advantageous in that it can increase the output without having to increase the turbine inlet temperature, regardless of the operational state of the gas turbine.

DESCRIPTION OF EMBODIMENTS

Embodiments of a gas-turbine control device and a gas-turbine control method according to the present invention will be described below with reference to the drawings.

First Embodiment

A gas-turbine control device and a gas-turbine control method according to a first embodiment of the present invention will now be described.

Figure 1:
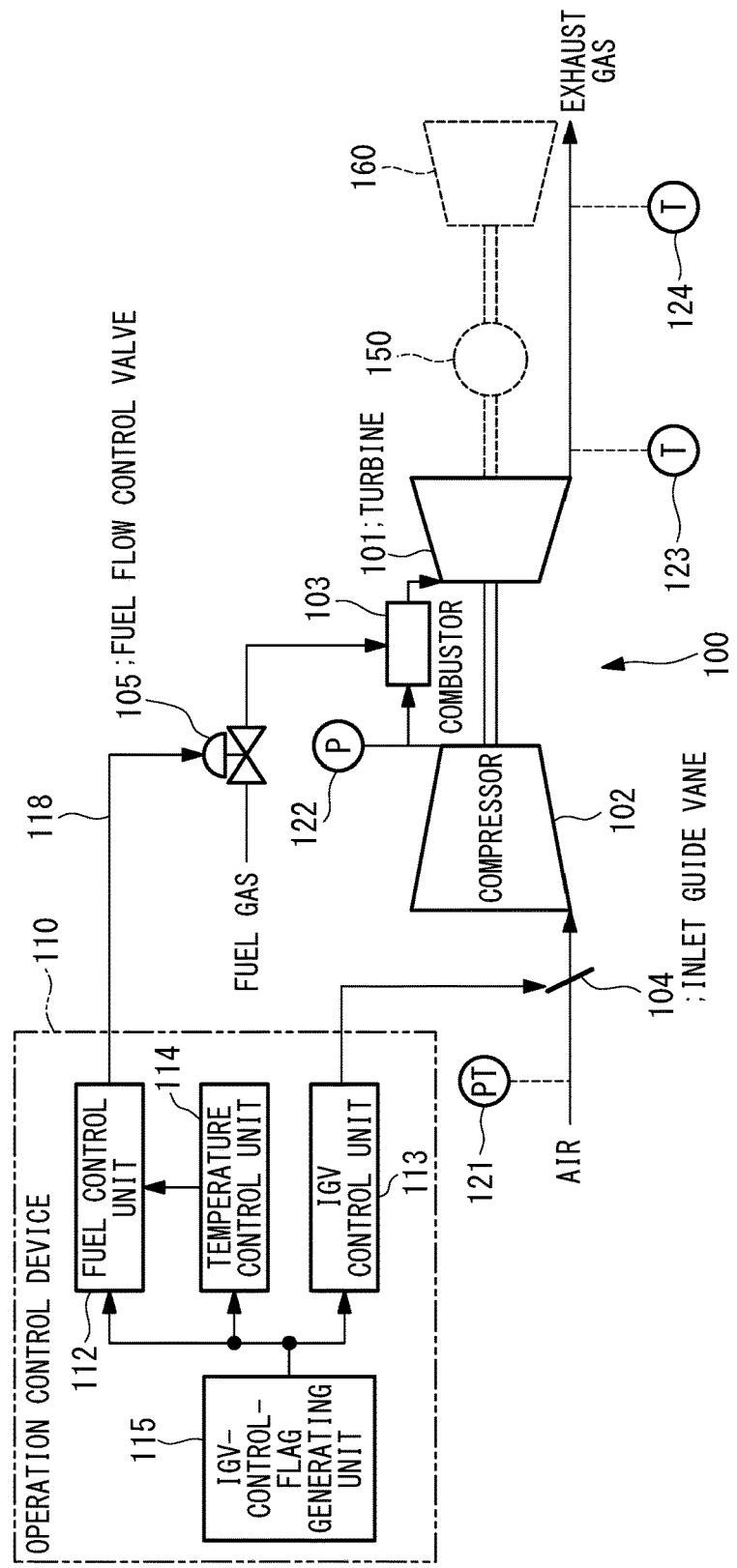
FIG. 1 illustrates the configuration of a gas turbine according to a first embodiment of the present invention.

FIG. 1 illustrates the configuration of a gas turbine 100 according to the first embodiment.

In FIG. 1, the gas turbine 100 includes a compressor 102, a combustor 103, and a turbine 101. Air compressed by the compressor 102 and fuel flow-controlled by a fuel flow control valve 105 are supplied to the combustor 103 where the air and the fuel are mixed and combusted so that high-pressure combustion gas is produced. The high-temperature combustion gas is supplied to the turbine 101 and is expanded so as to drive the turbine 101. This driving force is transmitted to a power generator 150 where electricity is generated, and is also transmitted to the compressor 102 so as to drive the compressor 102.

The fuel flow control valve 105 is actuated in accordance with a control signal 118 from a fuel control unit 112 of an operation control device 110. This fuel flow control valve 105 controls the fuel flow of fuel gas, as described above, so as to adjust the load and also the exhaust gas temperature. In the case of a single-shaft combined-cycle power plant, rotation shafts of the gas turbine 100, the power generator 150, and a steam turbine 160 are combined into a single unit.

An inlet guide vane (IGV) 104 is provided in front of the first-stage airfoil of the compressor 102. Intake air is given a certain circumferential speed by the inlet guide vane 104 and is introduced to the compressor 102. In the compressor 102, the air introduced thereto travels through multiple stages of rotor blades and stator vanes and increases in pressure by being given energy. In the inlet guide vane 104, a large number of movable vanes provided in the circumferential direction are supported in a rotatable manner. An actuator for the inlet guide vane 104 is actuated in accordance with an IGV degree-of-opening command from an IGV control unit 113 of the operation control device 110 so that these movable vanes are moved, whereby the intake-air flow and the combustion temperature are adjusted.

A blade-passing temperature detector 123 that detects the temperature of gas that has passed final-stage blades is provided at the final stage of the turbine 101. Furthermore, an exhaust-gas temperature detector 124 that detects the temperature of exhaust gas is provided in an exhaust path located downstream of the position where the blade-passing temperature detector 123 is disposed. Moreover, an intake-air state detector 121 that detects the state of intake air is provided so as to detect the intake-air temperature and the intake-air pressure. The pressure inside a casing of the combustor 103 is detected by a casing internal-pressure detector 122. Furthermore, a power-generator output sensor (not shown) for detecting the load state of the turbine 101 is also provided.

Detection signals obtained by the blade-passing temperature detector 123, the exhaust-gas temperature detector 124, the intake-air state detector 121, the casing internal-pressure detector 122, and the power-generator output sensor are input to the operation control device 110. The operation control device 110 includes the fuel control unit 112 that performs fuel supply control, a temperature control unit 114 that performs blade-passing temperature control and exhaust-gas temperature control, the IGV control unit 113 that controls the degree of opening of the inlet guide vane 104, and an IGV-control-flag generating unit 115 that generates an IGV priority open flag (IGV priority open signal).

Figure 2:
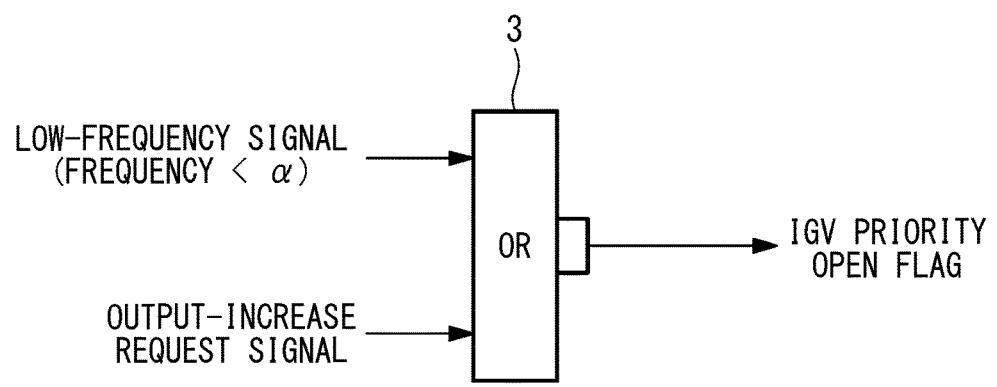
FIG. 2 illustrates the configuration of an IGV-control-flag generating unit according to the first embodiment of the present invention.

FIG. 2 illustrates the configuration of the IGV-control-flag generating unit 115.

The IGV-control-flag generating unit 115 enables the IGV priority open flag in a case where the output of the gas turbine 100 is to be increased.

For example, if the system frequency becomes lower than or equal to a predetermined threshold value α and the IGV-control-flag generating unit 115 receives a low-frequency signal or if the IGV-control-flag generating unit 115 receives an output-increase request signal for requesting an increase in the output of the gas turbine 100, the IGV-control-flag generating unit 115 enables and generates an IGV priority open flag by means of an OR gate 3. If the system frequency is lower than or equal to the predetermined threshold value α, the gas turbine 100 increases its output so as to increase the system frequency.

Figure 3:
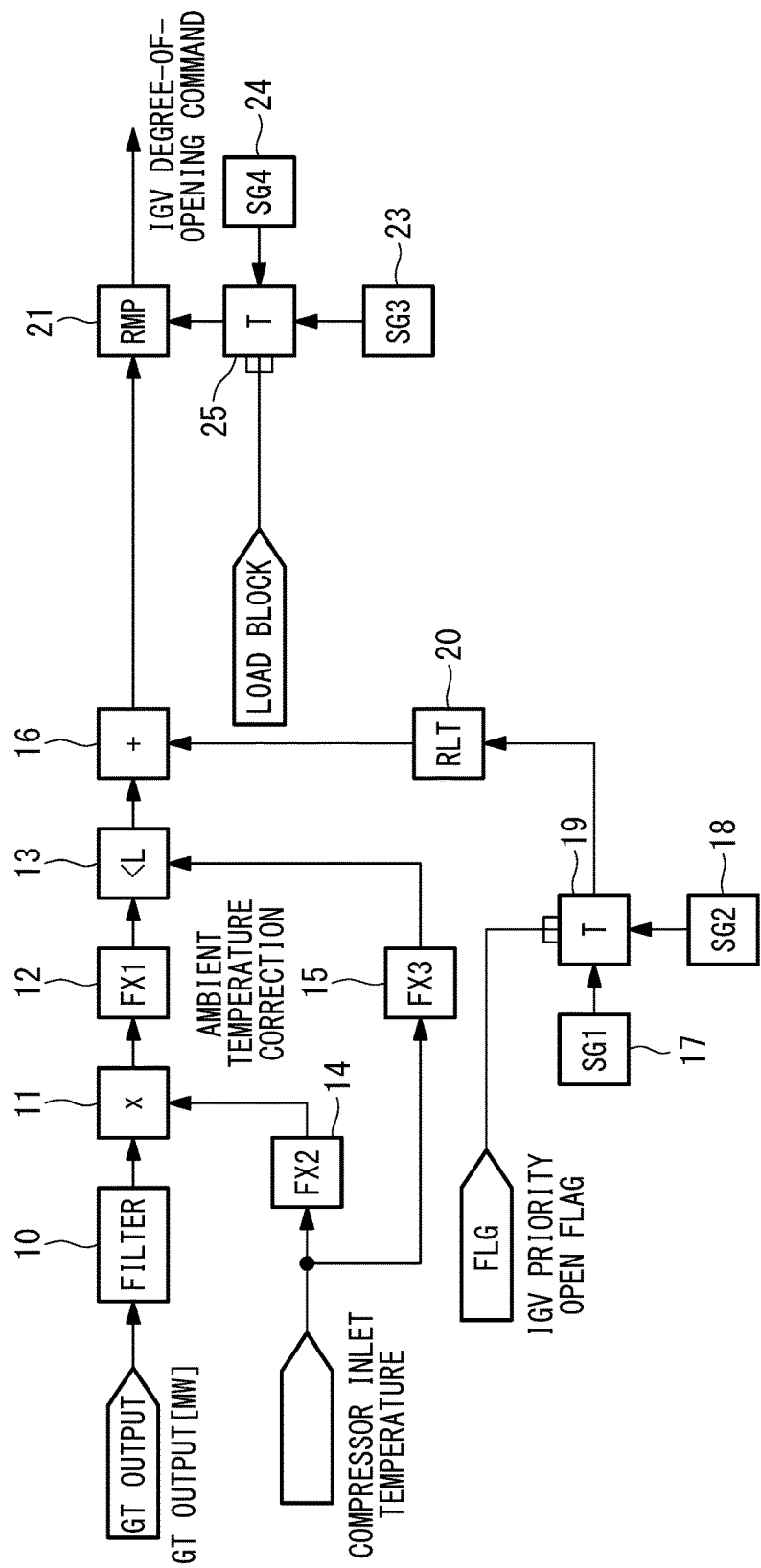
FIG. 3 illustrates the configuration of an IGV control unit according to the first embodiment of the present invention.

The IGV control unit 113 is configured as shown in FIG. 3.

Figure 12:
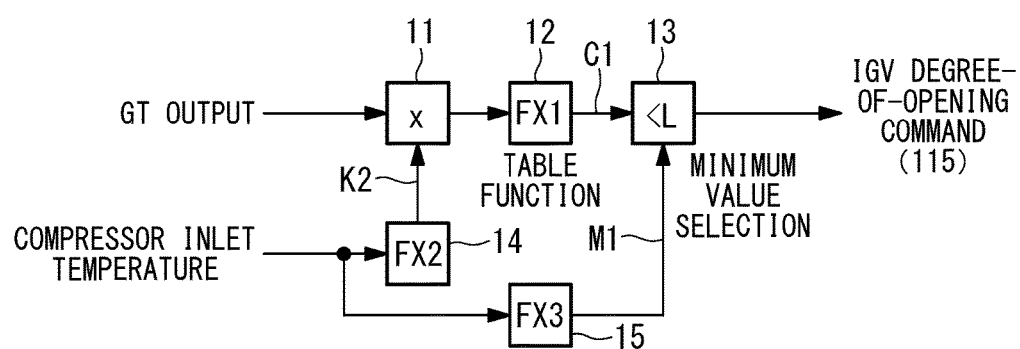
FIG. 12 illustrates the configuration of an IGV control unit in the related-art example.
Figure 13:
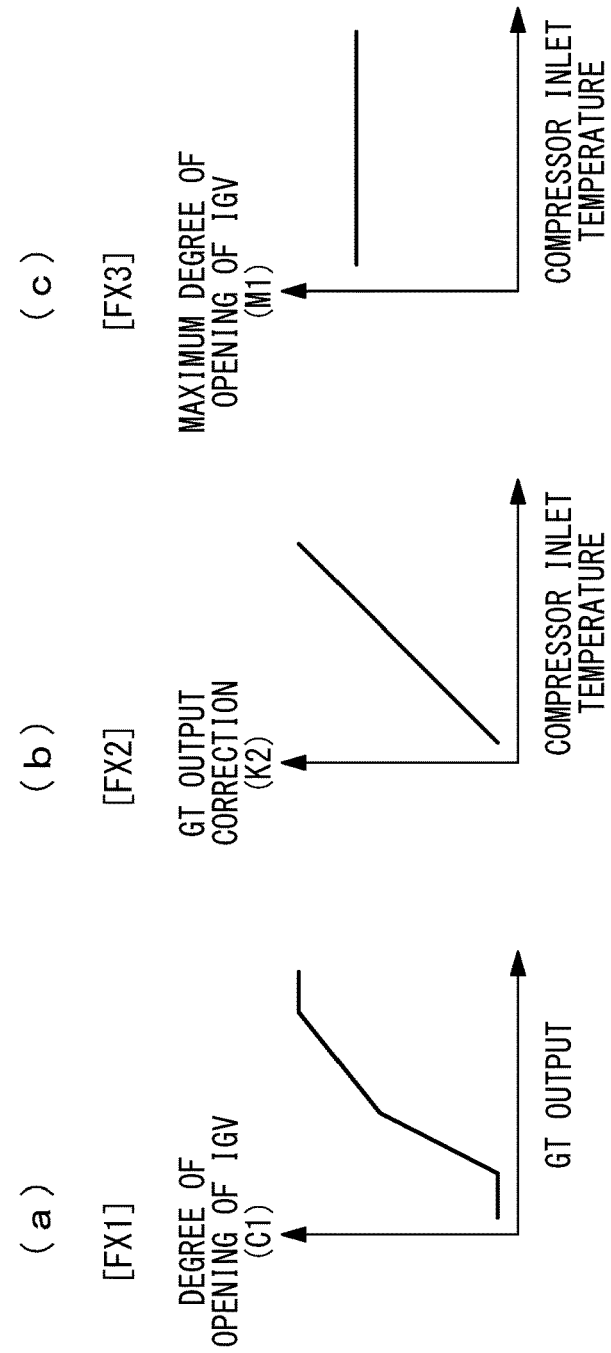
FIG. 13 illustrates functions included in various types of function units of the IGV control unit in the related-art example.
Figure 14:
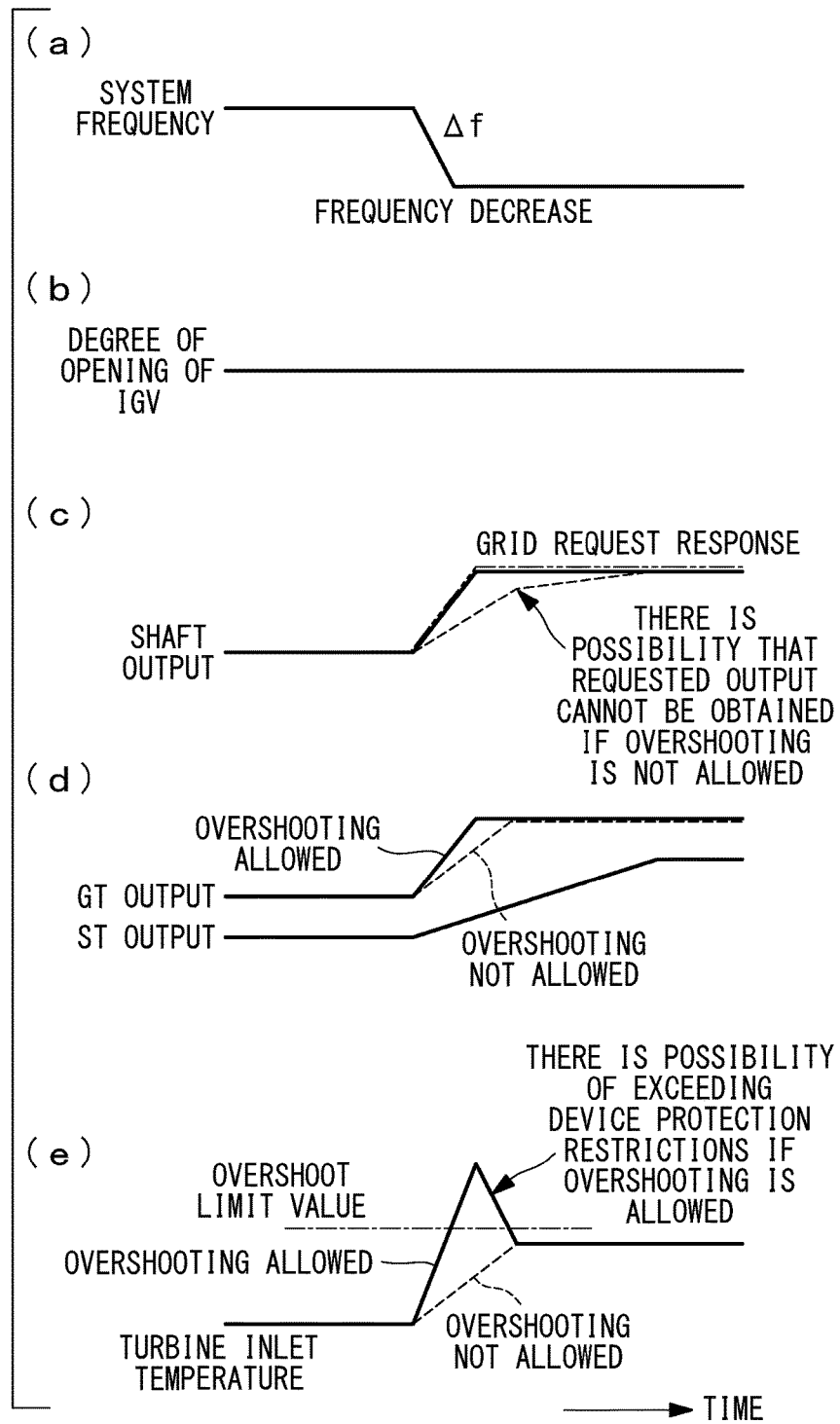
FIG. 14 is a timing chart with respect to various levels when the system frequency decreases in the related-art example.

In FIG. 3, a multiplier 11, a table function unit (FX1) 12, a limiter 13, a correction function unit (FX2) 14, and a limiter function unit (FX3) 15 have configurations similar to those in the related art (see FIG. 12). The IGV control unit 113 according to the first embodiment is additionally provided with a configuration for adding an additional amount based on the IGV priority open flag to the IGV degree-of-opening command in the related art and a configuration for limiting the rate of change of the degree of opening of the IGV. In the IGV control unit 113 according to the first embodiment, a GT output value is input to the multiplier 11 via a filter 10.

In the configuration for adding the additional amount, a signal switch unit 19 switches between signal generators (SG1) 17 and (SG2) 18 in accordance with the IGV priority open flag, and an adder 16 adds the additional amount to the IGV degree-of-opening command corresponding to normal operation via a rate limiter 20.

Accordingly, when the IGV priority open flag is enabled, the degree of opening of the inlet guide vane 104 is set to be larger than before.

For example, when "0" is set in the signal generator (SG1) 17, a predetermined value is set in the signal generator (SG2) 18, and the IGV priority open flag is enabled, the predetermined value of the signal generator (SG2) 18 is added to the IGV degree-of-opening command corresponding to normal operation so that the degree of opening of the inlet guide vane 104 becomes larger than normal.

In the configuration for limiting the rate of change of the degree of opening of the IGV, a signal switch unit 25 switches between signal generators (SG3) 23 and (SG4) 24 in accordance with a load block flag, and this is supplied to a rate-of-change limiter 21 where a rate-of-change limit value for the degree of opening of the IGV is changed. A normal rate-of-change limit value (e.g., 400 [%/minute]) is set in the signal generator (SG3) 23, whereas a load-block rate-of-change limit value (e.g., 3000 [%/minute]) is set in the signal generator (SG4) 24.

Next, operation control performed by the operation control device 110 of the gas turbine 100 according to the first embodiment will be described.

If the system frequency becomes lower than or equal to the predetermined value α in a state where the gas turbine 100 operates with a partial load, or if there is a request for increasing the output of the gas turbine 100 in a state where the gas turbine 100 operates with a partial load, the IGV-control-flag generating unit 115 enables the IGV priority open flag.

In response to this, the IGV control unit 113 sets the degree of opening of the inlet guide vane 104 to be larger than before, so that the degree of opening of the inlet guide vane 104 becomes larger than normal.

Because the turbine inlet temperature is normally proportional to the fuel-air ratio (i.e., the ratio of the amount of fuel to the amount of combustible air), changing the degree of opening of the IGV in the direction that causes the inlet guide vane 104 to open would increase the intake-air flow of the compressor 102 and thus increase the amount of combustible air, thereby causing the fuel-air ratio, that is, the turbine inlet temperature, to decrease.

Specifically, when the IGV priority open flag is enabled, the degree of opening of the inlet guide vane 104 is set to be larger than normal, so that the intake-air flow of the compressor 102 increases from its normally set flow. Thus, the gas turbine 100 can operate with the turbine inlet temperature lower than normal, so that the turbine output can be increased in accordance with the increased air flow. For example, the degree of opening of the inlet guide vane 104 is increased by 10% to 20%, and the air flow is increased by 5% to 10% relative to the rated flow.

In detail, the relationship "turbine output=turbine-passing flow×turbine heat drop×efficiency" holds, so that by changing the degree of opening of the IGV in the direction that causes the inlet guide vane 104 to open, the intake-air flow of the compressor 102 increases, thereby also causing the turbine-passing flow to increase. Therefore, if an increase in the turbine-passing flow has a greater contribution than a heat drop caused by a decrease in the turbine inlet temperature, the output of the power generator 150 would increase.

Furthermore, because the intake-air flow of the compressor 102 increases to cause the turbine inlet temperature to decrease, a larger amount of fuel can be injected into the combustor 103, so that the turbine output can be increased also by fuel injection.

Figure 4:
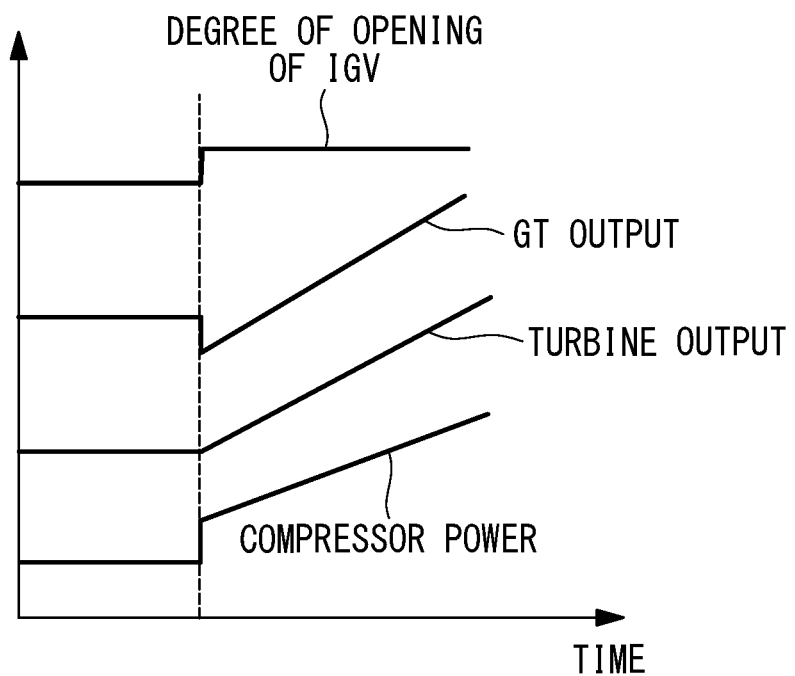
FIG. 4 illustrates an example of temporal changes in compressor power, turbine output, and GT output when an inlet guide vane opens at a steep rate.

Since opening the inlet guide vane 104 would cause the intake-air flow of the compressor 102 to increase, the power of the compressor 102 increases. Therefore, as shown in an example in FIG. 4, when the inlet guide vane 104 opens at a steep rate, the rate of increase of the power of the compressor 102 is higher than the rate of increase of the turbine output, possibly resulting in a temporary decrease in the GT output (i.e., power-generator output).

Therefore, in the rate limiter 20, the rate of change is set such that the rate of increase of the turbine output is higher than the rate of increase of the power of the compressor 102. Accordingly, a temporary decrease in the GT output occurring with an increase in the power of the compressor 102 caused by opening the inlet guide vane 104 can be suppressed.

As described above, the operation control device 110 of the gas turbine 100 according to the first embodiment enables the IGV priority open flag if the system frequency becomes lower than or equal to the predetermined threshold value α or if there is a request for increasing the output of the gas turbine 100, and sets the degree of opening of the inlet guide vane 104 to be larger than before if the IGV priority open flag is enabled.

Therefore, the output can be increased without having to increase the turbine inlet temperature, regardless of the operational state of the gas turbine 100.

Second Embodiment

A second embodiment of the present invention will be described below.

The configurations of the gas turbine 100 and the IGV control unit 113 according to the second embodiment are similar to those in the first embodiment, and descriptions of the components will therefore be omitted.

The gas turbine 100 controls the degree of opening of the fuel flow control valve 105 in accordance with the control signal 118 from the fuel control unit 112 included in the operation control device 110 and adjusts the load by performing fuel flow control. Based on a blade-passing-temperature set value BPCSO in blade-passing temperature control, an exhaust-gas-temperature set value EXCSO in exhaust-gas temperature control, a governor set value GVCSO in governor control, and a load-limit set value LDCSO in load limit control, the fuel control unit 112 uses the lowest value among the above values as an ultimate control signal 118 for the fuel flow control valve 105.

In blade-passing temperature control, the temperature control unit 114 measures the blade-passing temperature (i.e., the exhaust gas temperature immediately after the final stage of the turbine 101), compares the measured blade-passing temperature with a target value based on a temperature control setting, and generates a blade-passing-temperature set value BPCSO by performing proportional-plus-integral (PI) control. In exhaust-gas temperature control, the temperature control unit 114 measures the exhaust gas temperature (i.e., the exhaust gas temperature in an exhaust duct located downstream of the final stage of the turbine 101), compares the measured exhaust gas temperature with a target value based on the temperature control setting, and generates an exhaust-gas-temperature set value EXCSO by performing proportional-plus-integral (PI) control.

Figure 5:
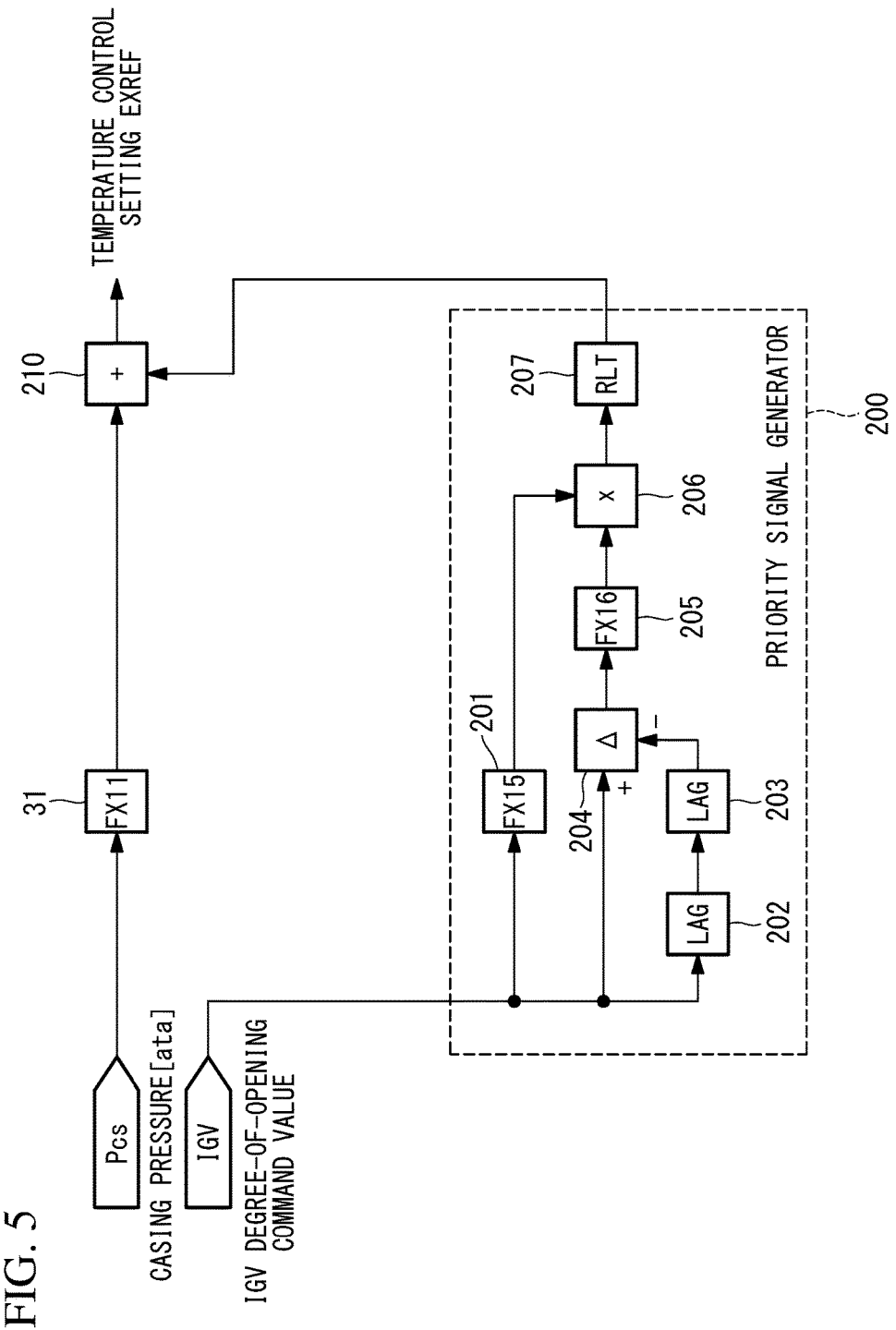
FIG. 5 illustrates the configuration of a section where a temperature control setting is generated in a temperature control unit according to a second embodiment of the present invention.

FIG. 5 illustrates the configuration of a section where a temperature control setting EXREF is generated in the temperature control unit 114 according to the second embodiment.

In FIG. 5, the section where the temperature control setting EXREF is generated in the temperature control unit 114 includes a function unit (FX11) 31, an adder 210, and a priority signal generator 200.

In the function unit (FX11) 31, a function that indicates the relationship between the casing pressure and the temperature control setting corresponding to normal operation is set. Specifically, during normal operation in which an IGV degree-of-opening command value for the inlet guide vane 104 is, for example, 0 [degrees] or higher, a temperature control setting EXREF based on the function unit (FX11) 31 is generated.

The priority signal generator 200 includes primary delay filters 202 and 203, a subtractor 204, a function unit (FX16) 205, a function unit (FX15) 201, a multiplier 206, and a rate limiter 207. The primary delay filters 202 and 203 may be a single primary delay filter (e.g., 202 alone) or may be three primary delay filters. The subtractor 204 and the primary delay filters 202 and 203 calculate rates of change but are not limited to this configuration so long as they are configured to detect rates of change.

In the priority signal generator 200, the subtractor 204 first determines a deviation between the IGV degree-of-opening command value and a signal delayed and a signal not delayed by the primary delay filters 202 and 203 and obtains this deviation as the rate of change (pseudo-differential value) of the IGV degree-of-opening command value. Then, in the function unit (FX16) 205, a correction amount (priority signal) for the temperature control setting EXREF is set in accordance with the magnitude of the rate of change (pseudo-differential value) of the IGV degree-of-opening command value.

The function unit (FX15) 201 sets the operating range of the priority signal generator 200 only when the degree of opening of the inlet guide vane 104 is within a predetermined range. For example, a function in which the degree-of-opening range for the degree of opening of the IGV is set at "1" for a partial load and is set at "0" when the IGV is fully opened is used as a function FX15, and this is multiplied at the multiplier 206 so that correction (priority signal) to be performed by the priority signal generator 200 can be enabled only when the gas turbine 100 is operating with a partial load.

The rate limiter 207 limits the correction amount for a temperature control setting EXREF to be obtained, that is, the time rate of change of the priority signal. The correction amount via the rate limiter 207 is added by the adder 210 so that a temperature control setting EXREF is generated.

Figure 6:
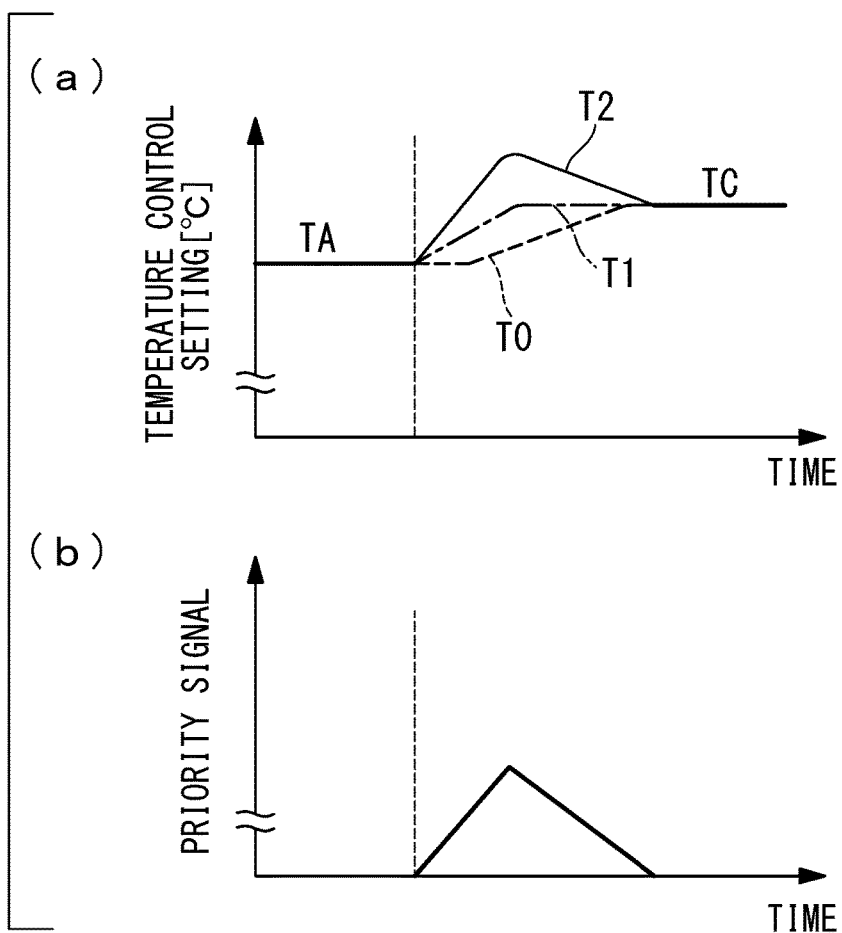
FIG. 6 illustrates switching of temperature control settings in accordance with the second embodiment of the present invention.

Although the temporal transition of the temperature control setting EXREF in this case is as indicated by T1 in FIG. 6(a), the actual blade-passing temperature or exhaust gas temperature changes slowly, as indicated by T0 in FIG. 6(a), since there is a delay in the measurement of the temperature. In the second embodiment, the correction amount (priority signal) according to the priority signal generator 200 is added, as shown in FIG. 6(b), so that the temporal transition of the temperature control setting EXREF is as indicated by T2 in FIG. 6(a), thereby speeding up the followability of the actual blade-passing temperature or exhaust gas temperature.

Accordingly, in the second embodiment, the priority signal generator 200 (first correcting unit) calculates the rate of change of the degree of opening of the inlet guide vane 104, calculates a correction amount according to the rate of change, and corrects the temperature control setting EXREF. This speeds up the followability of the blade-passing-temperature set value or the exhaust-gas-temperature set value so as to transiently speed up the relaxation of the temperature setting, thereby improving the load responsiveness relative to a change in the system frequency.

Third Embodiment

A third embodiment of the present invention will be described below.

Figure 7:
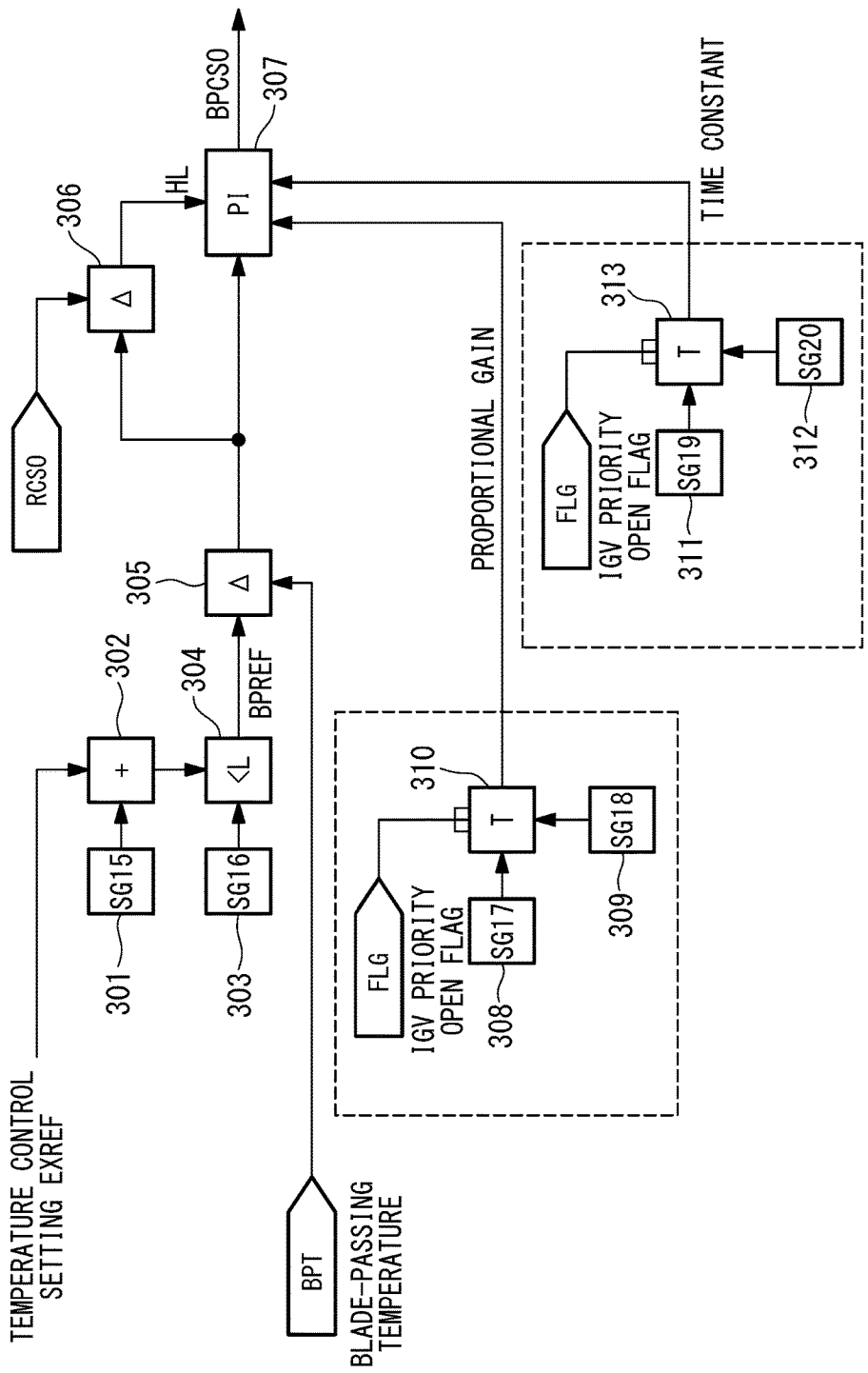
FIG. 7 illustrates the configuration of a blade-passing temperature control unit in a temperature control unit according to a third embodiment of the present invention.

FIG. 7 illustrates the configuration of a blade-passing temperature control unit in the temperature control unit 114 according to the third embodiment. The section where the temperature control setting EXREF is generated is not shown since the configuration according to the second embodiment is used. The configurations of the gas turbine 100 and the IGV control unit 113 according to the third embodiment are similar to those in the first embodiment, and descriptions of the components will therefore be omitted.

In FIG. 7, the blade-passing temperature control unit included in the temperature control unit 114 according to the third embodiment includes signal generators (SG15) 301, (SG16) 303, (SG17) 308, (SG18) 309, (SG19) 311, and (SG20) 312, signal switch units 310 and 313, an adder 302, subtractors 305 and 306, a low-value selector 304, and a PI controller 307.

The lower value of a value obtained at the adder 302 by adding a predetermined value SG15 to the temperature control setting EXREF and a predetermined value SG16 is selected by the low-value selector 304 and is set as a target value BPREF. The subtractor 305 determines a deviation between the target value BPREF and a blade-passing temperature measurement value BPT from the blade-passing temperature detector 123. The PI controller 307 performs proportional-plus-integral control on the basis of the deviation so that a blade-passing-temperature set value BPCSO is generated.

An upper limit value in the PI controller 307 is set to be a deviation between the deviation obtained by the subtractor 305 and a standby value RCSO. The blade-passing temperature control unit according to the third embodiment is characterized by setting control parameters in the PI controller 307 to preset values in a case where the IGV priority open flag is enabled. In this case, a proportional gain and a time constant are changed in accordance with the IGV priority open flag.

Specifically, a proportional gain is generated by using the signal switch unit 310 to switch between the signal generators (SG17) 308 and (SG18) 309 in accordance with the IGV priority open flag. In the signal generator (SG17) 308, a proportional gain corresponding to a normal state is set, whereas, in the signal generator (SG18) 309, a proportional gain corresponding to an IGV priority open state is set. A time constant is generated by using the signal switch unit 313 to switch between the signal generators (SG19) 311 and (SG20) 312 in accordance with the IGV priority open flag. In the signal generator (SG19) 311, a time constant corresponding to a normal state is set, whereas, in the signal generator (SG20) 312, a time constant corresponding to an IGV priority open state is set. From the standpoint of safety, it is preferable that the proportional gain and the time constant be set to smaller values. However, if the system frequency is lower than or equal to the predetermined value α or if there is a request for increasing the output of the gas turbine 100, followability should be given priority since there is urgency. In this case, it is desirable that the proportional gain and the time constant be set to values larger than normal.

Accordingly, in the blade-passing temperature control unit in the temperature control unit 114 according to the third embodiment (the same applies to an exhaust gas control unit), the PI controller 307 performs proportional-plus-integral control on the basis of a deviation between the target value BPREF based on the temperature control setting EXREF and the measured blade-passing temperature measurement value BPT so as to generate the blade-passing-temperature set value BPCSO of the turbine 101. In a case where the IGV priority open flag is enabled, the control parameters (i.e., the proportional gain and the time constant) in the PI controller 307 are set to preset values so as to give priority to speeding up the change of the blade-passing-temperature set value BPCSO, thereby improving the load responsiveness when the system frequency changes or when the load increases.

Fourth Embodiment

A fourth embodiment of the present invention will be described below.

Next, the operation control device 110 of the gas turbine 100 according to the fourth embodiment of the present invention will be described.

Figure 8:
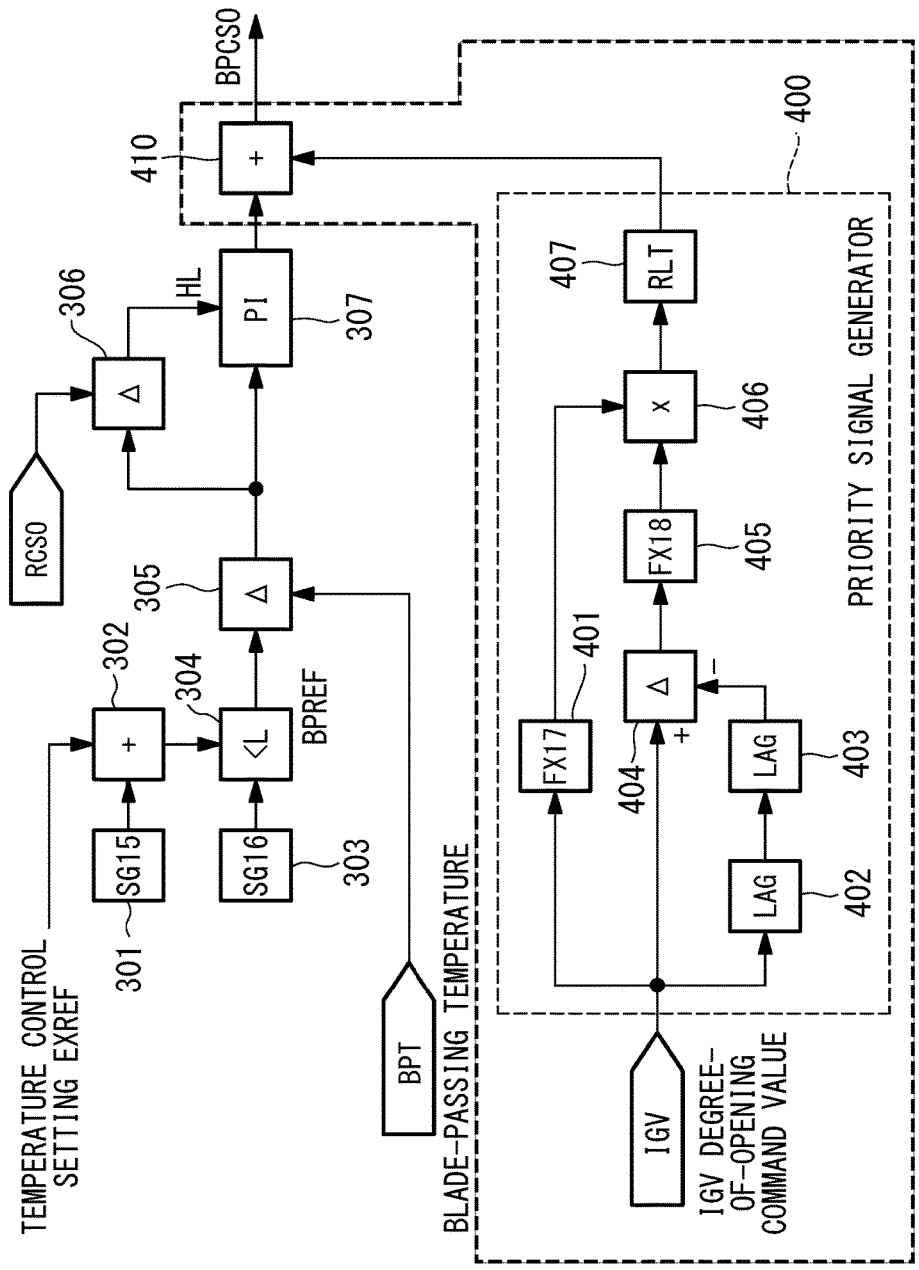
FIG. 8 illustrates the configuration of a blade-passing temperature control unit in a temperature control unit according to a fourth embodiment of the present invention.

FIG. 8 illustrates the configuration of the blade-passing temperature control unit in the temperature control unit 114 according to the fourth embodiment. The section where the temperature control setting EXREF is generated is not shown since the configuration according to the second embodiment is used. The configurations of the gas turbine 100 and the IGV control unit 113 according to the fourth embodiment are similar to those in the first embodiment, and descriptions of the components will therefore be omitted.

In FIG. 8, the blade-passing temperature control unit included in the temperature control unit 114 according to the fourth embodiment includes signal generators (SG15) 301 and (SG16) 303, adders 302 and 410, subtractors 305 and 306, a low-value selector 304, a PI controller 307, and a priority signal generator 400.

The lower value of a value obtained at the adder 302 by adding a predetermined value SG15 to the temperature control setting EXREF and a predetermined value SG16 is selected by the low-value selector 304 and is set as a target value BPREF. The subtractor 305 determines a deviation between the target value BPREF and a blade-passing temperature measurement value BPT from the blade-passing temperature detector 123. The PI controller 307 performs proportional-plus-integral control on the basis of the deviation so that a blade-passing-temperature set value BPCSO is generated. An upper limit value in the PI controller 307 is set to be a deviation between the deviation obtained by the subtractor 305 and a standby value RCSO.

The blade-passing temperature control unit included in the temperature control unit 114 according to the fourth embodiment is characterized by being additionally provided with the priority signal generator 400 (second correcting unit) that calculates the rate of change of the degree of opening of the inlet guide vane 104, calculates a correction amount according to the rate of change, and corrects the blade-passing-temperature set value BPCSO generated on the basis of the temperature control setting EXREF. The priority signal generator 400 includes primary delay filters 402 and 403, a subtractor 404, a function unit (FX18) 405, a function unit (FX17) 401, a multiplier 406, and a rate limiter 407. The primary delay filters may be a single primary delay filter or may be three primary delay filters. The subtractor 404 and the primary delay filters 402 and 403 calculate rates of change but are not limited to this configuration so long as they are configured to detect rates of change.

In the priority signal generator 400, the subtractor 404 first determines a deviation between an IGV degree-of-opening command value and a signal delayed and a signal not delayed by the primary delay filters 402 and 403 and obtains this deviation as the rate of change (pseudo-differential value) of the IGV degree-of-opening command value. Then, in the function unit (FX18) 405, a correction amount (priority signal) for the blade-passing-temperature set value BPCSO is set in accordance with the magnitude of the rate of change (pseudo-differential value) of the IGV degree-of-opening command value.

The function unit (FX17) 401 sets the operating range of the priority signal generator 400 only when the degree of opening of the inlet guide vane 104 is within a predetermined range. For example, a function in which the degree-of-opening range for the degree of opening of the IGV is set at "1" for a partial load and is set at "0" when the IGV is fully opened is used as a function FX17, and this is multiplied at the subtractor 306 so that correction (priority signal) to be performed by the priority signal generator 400 can be enabled only when the gas turbine 100 is operating with a partial load.

The rate limiter 407 limits the correction amount for the blade-passing-temperature set value BPCSO, that is, the time rate of change of the priority signal. The correction amount via the rate limiter 407 is added by the adder 410 so that the blade-passing-temperature set value BPCSO is generated.

Accordingly, in this embodiment, the priority signal generator 400 (second correcting unit) calculates the rate of change of the degree of opening of the inlet guide vane 104, calculates a correction amount according to the rate of change, and performs correction by adding the correction amount (priority signal) directly to the blade-passing-temperature set value BPCSO, thereby directly giving priority to the change of the blade-passing-temperature set value BPCSO. This speeds up the followability so as to transiently speed up the relaxation of the temperature setting, thereby improving the load responsiveness when the system frequency changes or when the load increases.

Fifth Embodiment

Next, the operation control device 110 of the gas turbine 100 according to a fifth embodiment will be described.

Figure 9:
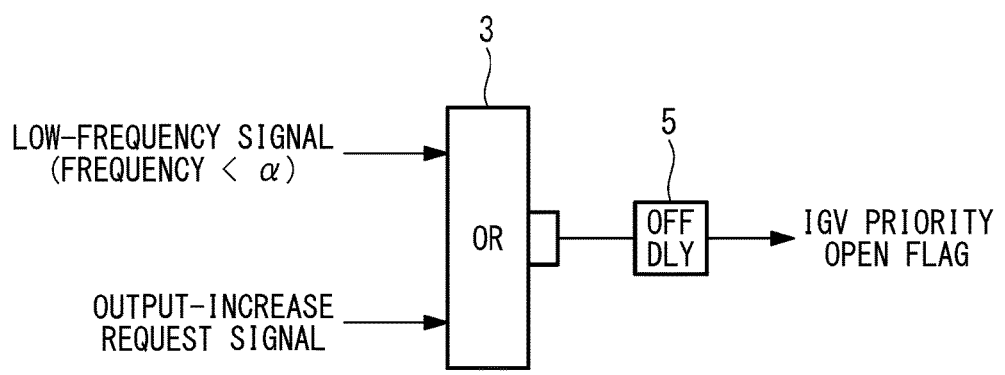
FIG. 9 illustrates the configuration of an IGV-control-flag generating unit according to a fifth embodiment of the present invention.

FIG. 9 illustrates the configuration of the IGV-control-flag generating unit 115 according to the fifth embodiment. The overall configuration of the operation control device 110 of the gas turbine 100 is similar to those in the first to fourth embodiments described above, and descriptions of the components will therefore be omitted.

The IGV-control-flag generating unit 115 according to the fifth embodiment is similar to that in the first embodiment in that it enables the IGV priority open flag when the system frequency becomes lower than or equal to the predetermined threshold value α or when there is a request for increasing the output of the gas turbine 100, but is configured to add an off delay 5 to the output of the OR gate 3, as shown in FIG. 9.

With this off delay 5, the IGV priority open flag can be disabled after a certain delay when the IGV priority open flag switches from an enabled state to a disabled state. The delay time according to the off delay 5 is set approximately equal to, for example a boiler time constant ranging between, for example, 5 minutes to 10 minutes.

Even when the system frequency is not changing, the load responsiveness (followability) is poor at a high load when the load increases in GTCC due to a delay in the output (ST output) of the steam turbine 160 during a load increase and also due to the upper limit according to temperature control operation for the output of the power generator 150. Therefore, the load followability is enhanced by opening the inlet guide vane 104 by a certain amount based on the IGV priority open flag. However, the inlet guide vane 104 is immediately closed when conditions are satisfied (i.e., when a desired load is reached). This results in frequent opening-closing operation of the inlet guide vane 104. From the standpoint of performance and component life, it is necessary to prevent such frequent operation.

In the fifth embodiment, the off delay 5 is added to the IGV-control-flag generating unit 115 so that even after a low-frequency signal or an output-increase request signal changes to an off state during a load increase, the IGV priority open flag is maintained in the enabled state for a fixed period.

Accordingly, from the standpoint of performance and component life, frequent opening-closing operation of the inlet guide vane 104 can be prevented.

Sixth Embodiment

Next, the operation control device 110 of the gas turbine 100 according to a sixth embodiment will be described.

Figure 10:
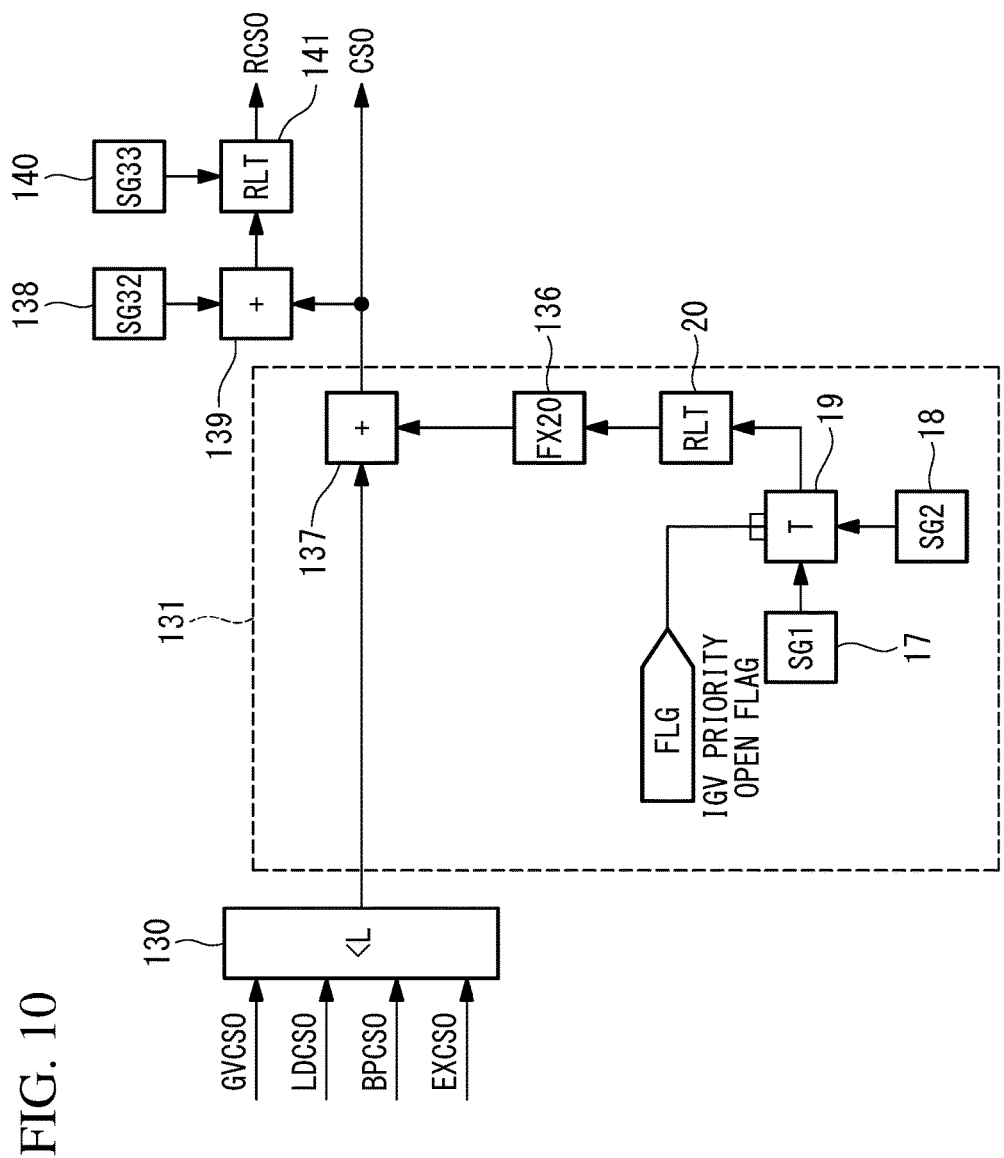
FIG. 10 illustrates the configuration of a fuel control unit according to a sixth embodiment of the present invention.
Figure 11:
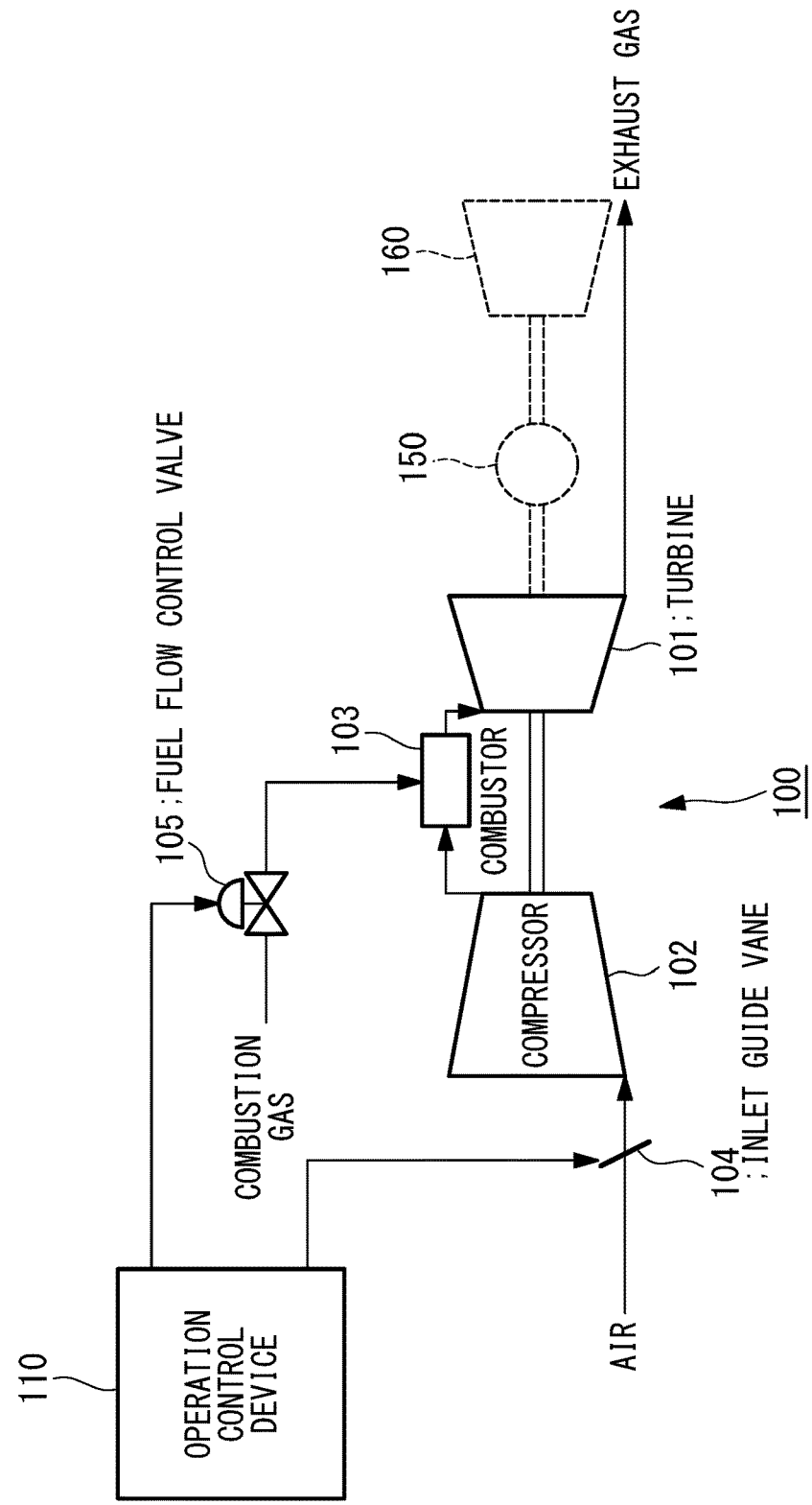
FIG. 11 illustrates the configuration of a gas turbine in a related-art example.

FIG. 10 illustrates the configuration of the fuel control unit 112 according to the sixth embodiment. The overall configuration of the operation control device 110 of the gas turbine 100 is similar to those in the first to fifth embodiments described above, and descriptions of the components will therefore be omitted.

When the IGV priority open flag is enabled, the fuel control unit 112 according to the sixth embodiment increases the fuel flow in accordance with the degree of opening of the inlet guide vane 104.

The fuel control unit 112 includes a CSO correcting unit 131 that corrects a CSO output from a low-value selector 130.

The low-value selector 130 receives, for example, a governor set value GVCSO, a load-limit set value LDCSO, a blade-passing-temperature set value BPCSO, and an exhaust-gas-temperature set value EXCSO and outputs the lowest CSO among these input values.

The CSO correcting unit 131 includes a signal generator (SG1) 17, a signal generator (SG2) 18, a signal switch unit 19, a rate limiter 20, a correction function unit (FX20) 136, and an adder 137.

The signal generator (SG1) 17 generates a first signal that is set to, for example, "0". The signal generator (SG2) 18 generates a second signal indicating a predetermined value. The signal switch unit 19 switches between the signal generators (SG1) 17 and (SG2) 18 in accordance with whether the IGV priority open flag is enabled or disabled. The rate limiter 20 limits the time rate of change of the signal from the signal switch unit 19. The correction function unit (FX20) 136 calculates a correction value of fuel flow (CSO) in accordance with an increase in air flow set on the basis of the IGV priority open flag. The adder 137 adds the correction value output from the correction function unit (FX20) 136 to the CSO output from the low-value selector 130 and outputs the corrected CSO.

According to this configuration, if the IGV priority open flag is disabled, the first signal of the signal generator (SG1) 17 is selected by the signal switch unit 19, and the correction value according to the first signal is added to the CSO output from the low-value selector 130. In this case, since the first signal is set to "0", if the IGV priority open flag is disabled, the CSO selected by the low-value selector 130 is directly output as a corrected CSO.

In contrast, if the IGV priority open flag is enabled, the second signal of the signal generator (SG2) 18 is selected by the signal switch unit 19, and the correction value according to the second signal is added to the CSO output from the low-value selector 130. Accordingly, when the IGV priority open flag is enabled, the CSO selected by the low-value selector 130 has the correction value added thereto and is output as a corrected CSO. Consequently, when the IGV priority open flag is enabled, the fuel flow to be supplied to the combustor 103 increases.

With regard to a standby value RCSO, a value output from a signal generator (SG32) 138 is added to the CSO output from the adder 137 by an adder 139 and is calculated via a rate limiter 141 in accordance with a rate of change (decreasing rate) output from a signal generator (SG33) 140.

If the degree of opening of the inlet guide vane 104 is set to be larger than normal so as to improve the load responsiveness in a case where the load is to be increased when the inlet guide vane 104 is not fully open, there is a concern that the turbine inlet temperature may decrease excessively. In the operation control device 110 of the gas turbine 100 according to the sixth embodiment, the fuel flow can be increased in accordance with an increase in air flow caused by increasing the degree of opening of the inlet guide vane 104, thereby preventing an excessive decrease in the turbine inlet temperature.

Although the present invention has been described above with reference to the above embodiments, the technical scope of the present invention is not limited to the scope of the above embodiments. Various modifications or alterations may be added to each of the above embodiments so long as they do not depart from the scope of the invention. Embodiments with the modifications or alterations added thereto are included in the technical scope of the present invention. Furthermore, the above embodiments may be combined, where appropriate.

REFERENCE SIGNS LIST

100 gas turbine
101 turbine
102 compressor
103 combustor
104 inlet guide vane
105 fuel flow control valve
110 operation control device
112 fuel control unit
113 IGV control unit
114 temperature control unit
115 IGV-control-flag generating unit
150 power generator

The invention claimed is:

1. A gas-turbine control device for a gas turbine that drives a power generator by rotating a turbine using combustion gas generated in a combustor as a result of supplying the combustor with fuel and compressed air from a compressor, which is provided with an inlet guide vane at a front stage, the gas-turbine control device comprising:
    an IGV-control-flag generating unit that enables an IGV priority open flag when an output of the gas turbine is to be increased in a state where the gas turbine operates with a partial load;
    an inlet-guide-vane degree-of-opening setting unit that sets a degree of opening of the inlet guide vane to be larger than before if the IGV priority open flag is enabled so that the output of the turbine increases due to intake-air flow in the compressor increasing to a level higher than or equal to a heat drop caused by a decrease in turbine inlet temperature; and
    a fuel control unit that outputs a control signal for a fuel flow control valve for controlling flow of the fuel,
    wherein the fuel control unit includes:
        a low-value selector that outputs a lowest value, as the control signal for fuel flow, among a blade-passing-temperature set value in blade-passing temperature control, an exhaust-gas-temperature set value in exhaust-gas temperature control, a governor set value in governor control, and a load-limit set value in load limit control; and
        a correcting unit that adds a correction value in accordance with the degree of opening of the inlet guide vane to the control signal output from the low-value selector and that increases fuel flow supplied to the combustor, when the IGV priority open flag is enabled.

2. The gas-turbine control device according to claim 1, wherein the IGV-control-flag generating unit enables the IGV priority open flag when a system frequency is lower than or equal to a predetermined threshold value or when an increase of the output of the gas turbine is requested.

3. The gas-turbine control device according to claim 2, wherein the inlet-guide-vane degree-of-opening setting unit sets a rate of change of the degree of opening of the inlet guide vane such that a rate of increase of the output of the turbine is higher than a rate of increase of power of the compressor.

4. The gas-turbine control device according to claim 1, wherein the inlet-guide-vane degree-of-opening setting unit sets a rate of change of the degree of opening of the inlet guide vane such that a rate of increase of the output of the turbine is higher than a rate of increase of power of the compressor.

5. The gas-turbine control device according to claim 4, further comprising:
    a temperature control unit that sets a temperature control setting in accordance with a casing pressure,
    wherein the temperature control unit has a first correcting unit that calculates a rate of change of the degree of opening of the inlet guide vane, calculates a correction amount according to the rate of change, and corrects the temperature control setting when the IGV priority open flag is enabled.

6. The gas-turbine control device according to claim 4, further comprising:
    a temperature control unit that sets a temperature control setting in accordance with a casing pressure,
    wherein the temperature control unit has a PI control unit that performs proportional-plus-integral control on the basis of a deviation between a target value based on the temperature control setting and either a measured blade-passing temperature or an exhaust gas temperature so as to generate the blade-passing-temperature set value or the exhaust-gas-temperature set value of the turbine, and wherein when the IGV priority open flag is enabled, the temperature control unit sets a control parameter in the PI control unit to a preset value.

7. The gas-turbine control device according to claim 4, further comprising:
    a temperature control unit that sets a temperature control setting in accordance with a casing pressure,
    wherein the temperature control unit has a second correcting unit that calculates a rate of change of the degree of opening of the inlet guide vane, calculates a correction amount according to the rate of change, and corrects the blade-passing-temperature set value or the exhaust-gas-temperature set value of the turbine generated on the basis of the temperature control setting.

8. The gas-turbine control device according to claim 7, wherein when the IGV priority open flag changes from an enabled state to a disabled state, the IGV-control-flag generating unit disables the IGV priority open flag after a certain delay.

9. A gas turbine comprising:
a compressor provided with an inlet guide vane at a front stage;
a combustor that generates combustion gas by being supplied with fuel and compressed air from the compressor;
a turbine rotated by the combustion gas generated in the combustor;
a power generator driven by the rotation of the turbine; and
the control device according to claim 1.

10. A gas-turbine control method for a gas turbine that drives a power generator by rotating a turbine using combustion gas generated in a combustor as a result of supplying the combustor with fuel and compressed air from a compressor, which is provided with an inlet guide vane at a front stage, the gas-turbine control method comprising:
an IGV-control-flag generating step for enabling an IGV priority open flag when an output of the gas turbine is to be increased in a state where the gas turbine operates with a partial load;
an inlet-guide-vane degree-of-opening setting step for setting a degree of opening of the inlet guide vane to be larger than before if the IGV priority open flag is enabled so that the output of the turbine increases due to intake-air flow in the compressor increasing to a level higher than or equal to a heat drop caused by a decrease in turbine inlet temperature; and
a fuel controlling step for outputting a control signal for a fuel flow control valve for controlling flow of the fuel,
wherein the fuel controlling step includes:
a low-value selecting step for outputting a lowest value, as the control signal for fuel flow, among a blade-passing-temperature set value in blade-passing temperature control, an exhaust-gas-temperature set value in exhaust-gas temperature control, a governor set value in governor control, and a load-limit set value in load limit control; and
a correcting step for adding a correction value in accordance with the degree of opening of the inlet guide vane to the control signal output from the low-value selecting step and for increasing fuel flow supplied to the combustor, when the IGV priority open flag is enabled.

* * * * *